(12) United States Patent
Petite

(10) Patent No.: US 6,628,764 B1
(45) Date of Patent: Sep. 30, 2003

(54) SYSTEM FOR REQUESTING SERVICE OF A VENDING MACHINE

(75) Inventor: Thomas D. Petite, Douglasville, GA (US)

(73) Assignee: Statsignal Systems, Inc., Atlanta, GA (US)

(*) Notice: Subject to any disclaimer, the term of this patent is extended or adjusted under 35 U.S.C. 154(b) by 0 days.

(21) Appl. No.: 09/558,030

(22) Filed: Apr. 25, 2000

Related U.S. Application Data

(63) Continuation-in-part of application No. 09/102,399, filed on Jun. 22, 1998, which is a continuation-in-part of application No. 09/102,178, filed on Jun. 22, 1998, which is a continuation-in-part of application No. 08/910,980, filed on Aug. 19, 1997, which is a continuation-in-part of application No. 08/895,720, filed on Jul. 17, 1997, now Pat. No. 5,926,531, which is a continuation-in-part of application No. 08/825,576, filed on Mar. 31, 1997.

(60) Provisional application No. 60/141,585, filed on Jun. 29, 1999, provisional application No. 60/059,643, filed on Sep. 20, 1997, and provisional application No. 60/040,316, filed on Feb. 14, 1997.

(51) Int. Cl.$^7$ ............................................. H04M 11/00
(52) U.S. Cl. ............................... 379/106.01; 379/93.12; 700/236
(58) Field of Search ........................ 379/93.12, 106.01, 379/39, 40; 700/231, 236, 244

(56) References Cited

U.S. PATENT DOCUMENTS

| | | | |
|---|---|---|---|
| 3,906,460 A | 9/1975 | Halpern | 340/172 |
| 4,605,844 A | 8/1986 | Haggan | 235/380 |
| 4,757,185 A | 7/1988 | Onishi | 235/379 |
| 4,800,543 A | 1/1989 | Lyndon-James et al. | 368/10 |
| 4,851,654 A | 7/1989 | Nitta | 235/492 |
| 4,897,644 A | 1/1990 | Hirano | 340/825 |
| 4,906,828 A | 3/1990 | Halpern | 235/379 |
| 4,991,008 A | 2/1991 | Nama | 358/108 |

(List continued on next page.)

Primary Examiner—Stella Woo
(74) Attorney, Agent, or Firm—Thomas, Kayden, Horstemeyer & Risley

(57) ABSTRACT

The present invention is generally directed to an automated system for monitoring and supplying a vending machine. In accordance with one aspect of the invention, the system includes a set of sensors configured to detect a variety of service conditions, including products being low or out of stock, as well as, out of order conditions. The sensors generate output signals that are input to a transmitter or transceiver disposed at (typically within) the vending machine. The transmitter includes circuitry that encodes the signals received from the sensors into a message that includes an instruction code. The transmitter further includes circuitry for transmitting the encoded message, preferably via radio frequency transmission (although other forms of transmission are consistent with the invention). The system further includes a transceiver located remotely (but nearby) from the transmitter, and configured to receive the transmitted signal. The transceiver includes circuitry for transmitting the encoded message until the message is received by a transceiver integrated with a device that can access the public switched telephone network. The transceiver may be configured to dial a defined telephone number associated with a central station. The transceiver further includes circuitry that, after the connection is established, controls the transmission of the encoded message to the central station. Accordingly, the central station includes an interface to the PSTN and circuitry configured to receive the encoded message transmitted from the transceiver. The central station further includes circuitry (which may be programmable—e.g., in the form of a computer) that evaluates the encoded message, and from that evaluation, determines the state of the vending machine sensors and dispatches appropriate personnel to service the machine.

24 Claims, 11 Drawing Sheets

U.S. PATENT DOCUMENTS

| | | | |
|---|---|---|---|
| 5,111,199 A | 5/1992 | Tomoda et al. | 340/825 |
| 5,113,183 A | 5/1992 | Mizuno et al. | 340/825 |
| 5,113,184 A | 5/1992 | Katayama | 340/825 |
| 5,130,519 A | 7/1992 | Bush et al. | 235/380 |
| 5,191,192 A | 3/1993 | Takahira et al. | 235/375 |
| 5,216,502 A | 6/1993 | Katz | 358/108 |
| 5,235,630 A | 8/1993 | Moody et al. | 379/37 |
| 5,253,167 A | 10/1993 | Yoshida et al. | 364/408 |
| 5,265,162 A | 11/1993 | Bush et al. | 380/24 |
| 5,305,370 A | 4/1994 | Kearns et al. | 379/45 |
| 5,317,309 A | 5/1994 | Vercellotti et al. | 340/825 |
| 5,319,364 A | 6/1994 | Waraksa et al. | 340/825 |
| 5,319,711 A | 6/1994 | Servi | 380/23 |
| 5,345,231 A | 9/1994 | Koo et al. | 340/870 |
| 5,347,263 A | 9/1994 | Carroll et al. | 340/572 |
| 5,354,974 A | 10/1994 | Eisenberg | 235/379 |
| 5,382,778 A | 1/1995 | Takahira et al. | 235/380 |
| 5,452,344 A * | 9/1995 | Larson | 379/107 |
| 5,467,082 A | 11/1995 | Sanderson | 340/825 |
| 5,484,997 A | 1/1996 | Haynes | 235/492 |
| 5,517,188 A | 5/1996 | Carroll et al. | 340/825 |
| 5,544,784 A * | 8/1996 | Malaspina | 221/135 |
| 5,548,632 A | 8/1996 | Walsh et al. | 379/58 |
| 5,550,359 A | 8/1996 | Bennett | 235/382 |
| 5,550,535 A | 8/1996 | Park | 340/825 |
| 5,565,857 A | 10/1996 | Lee | 340/825 |
| 5,963,452 A * | 10/1999 | Etoh et al. | 364/479.06 |
| 6,032,197 A * | 2/2000 | Birdwell et al. | 709/247 |
| 6,038,491 A * | 3/2000 | McGarry et al. | 700/231 |
| 6,181,981 B1 * | 1/2001 | Varga et al. | 700/236 |
| 6,233,327 B1 * | 5/2001 | Petite | 379/39 |
| 6,314,169 B1 * | 11/2001 | Schelberg, Jr. et al. | 379/93.12 |
| 6,430,268 B1 * | 8/2002 | Petite | 379/93.12 |
| 6,457,038 B1 * | 9/2002 | Defosse | 709/200 |
| 6,462,644 B1 * | 10/2002 | Howell et al. | 379/106.01 |

* cited by examiner

| INSTRUCTION CODE | FUNCTION |
|---|---|
| 00000001 | VENDING MACHINE "n" IS LOW ON PRODUCT X. |
| 00000002 | VENDING MACHINE "n" IS OUT OF PRODUCT X. |
| 00000003 | VENDING MACHINE "n" IS OUT OF PRODUCT Y. |
| 00000004 | VENDING MACHINE "n" IS OUT OF ORDER. |
| 00000005 | VENDING MACHINE "n" IS NOT LEVEL. |
| ... | ... |
| 00100101 | VENDING MACHINE "n" INTERNAL TEMPERATURE IS > 49 DEGREES F. |
| ... | ... |
| 00111101 | TRASH COMPACTOR "m" IS IN NEED OF SERVICE. |
| ... | ... |
| 10011001 | GAS TANK "k" IS LOW ON FUEL. |

SYSTEM FOR REQUESTING SERVICE OF A VENDING MACHINE

CROSS-REFERENCE TO RELATED APPLICATIONS

This application is a continuation-in-part of U.S. patent application Ser. No. 09/102,399, filed on Jun. 22, 1998, entitled, "Multi-Function General Purpose Transceiver," Ser. No. 09/102,178, filed Jun. 22, 1998, entitled, "Multi-Function General Purpose Transceiver," Ser. No. 08/825,576 filed Mar. 31, 1997 entitled "Transmitter For Accessing Automated Financial Transaction Machines", Ser. No. 08/895,720 entitled "Tranmitter For Accessing Pay-Type Telephones," Filed Jul. 17, 1997 now U.S. Pat. No. 5,926,531, and Ser. No. 08/910,980 filed Aug. 7, 1997 entitled "Transmitter For Automatically Communicating Information to a Communication Device", all of which claimed the benefit of U.S Provisional Patent Application Ser. No. 60/040,316 filed Feb. 14, 1997 and Ser. No. 60/059,643, filed Sep. 20, 1997, entitled, "System for Requesting Service of a Vending Machine" the contents of which are incorporated by reference in their entireties. This application further claims the benefit of U.S. Provisional Patent Application Ser. No. 60/141,585, filed Jun. 29, 1999, entitled, "Multi-Function General Purpose Transceiver" the contents of which is further incorporated by reference in its entirety.

TECHNICAL FIELD

The present invention generally relates to transceivers, and more particularly to a general purpose bi-directional radio frequency (RF) transceiver integrated in a vending machine for communicating information to a remote location.

BACKGROUND OF THE INVENTION

As is known, there are a wide variety of vending machines, including those that dispense soft drinks, juices, snacks, cigarettes, candy, etc. In accordance with the general operation of these devices, a patron inserts money into a machine and the machine dispenses some sort of product. In addition to the items listed above, additional products may include ice cream, tickets, tokens, money (e.g., money changers), etc. For purposes of this application, the term "vending machine" is to be accorded a broad definition. In this regard, vending machines include, but are not limited to, machines that typically accept currency (either in the form of cash, credit, bank, or debit cards) and dispense some sort of product. Vending machines, however, within the scope of the term as used herein, need not require direct payment into the machine, but may simply be a machine that dispenses an article of inventory.

A variety of problems are known to cause vending machines to become inoperable (at least temporarily). For example, the machine may run out of one or more products, it may run out of change, or other problems may arise. Typically, these problems are addressed by sending a person to periodically restock the machines, or check them for proper functionality. However, this method of maintenance and/or repair is inefficient, since the machines may not need restocking or servicing. At other times, the machines may have been out of order or out of stock for some period of time before the condition is observed in the periodic restock or service run. Indeed, it is relatively expensive to employ an individual to make these periodic status checks. Also, a machine may be disabled or otherwise in need of service for an undesirably lengthy period of time between service checks, before the service condition is noted and reported.

There are systems known in the prior art that address this general shortcoming. For example, U.S. Pat. No. 5,207,784 discloses an inventory control system for a vending machine. That patent discloses a system that maintains an accurate running count of products maintained with a vending machine, at any given time. This count, or inventory status, may be communicated to an inventory control center at any given time, via phone lines. As specifically disclosed in that patent, various vending machines are connected to an inventory control center by way of telephone lines. The '784 patent does not specify whether the telephone lines of that system are leased lines or whether they communicate to the control center through the public switched telephone network (PSTN). Nevertheless, the patent does teach that the phone lines are directly connected to the vending machines (see FIG. 1 and related discussion), and that the communication is performed by a modem disposed within each vending machine.

While the system of the '784 patent eliminates the need for a person to periodically check the machine(s) to determine whether they need to be restocked, it nevertheless suffers from other shortcomings. Most notably, the system of the '784 patent requires a phone line to be run directly to the vending machine(s). This limits the placement/location of such machines to locations where phone lines (and taps) presently exist, or requires the added expense of paying a telephone service provider to run and maintain a phone line for each machine. Furthermore, the system of the '784 patent does not address the problem of system failures. When machines malfunction (for any of a variety of reasons), the problem must be manually detected and reported to the vending machine owner (or management company) so that an appropriate repair technician may be dispatched to service the machine. Valuable time and sales may be lost before the condition is discovered and reported.

Another inventory control system is disclosed in U.S. Pat. No. 5,708,223. Specifically, the system disclosed in the '223 patent is a system for monitoring the inventory of ice in an ice dispensing machine (another type of vending machine—even though it may not require direct payment into the machine). The system detects a low threshold of product inventory and reports the condition to the ice supplier. The patent specifically teaches that the manner of reporting may "be by phone over either ground lines or cellular telephony, or by satellite, by radio transmission, or by local network." The method of communication, however, is directly to the supplier. Furthermore, the system, like that disclosed in the '784 patent does not address equipment failure. Thus, a mechanical failure must be manually detected and reported.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a vending machine that utilizes a multi-function bi-directional transceiver for use in an automated system for monitoring and servicing remotely located vending machines. In accordance with one aspect of the invention, the system includes a transmitter disposed at a first location and configured to transmit a signal containing an instruction code to a bi-directional transceiver. The instruction code uniquely identifies an instruction to be carried out. Preferably, the transmitter transmits a relatively low-power radio-frequency electromagnetic signal. The system further includes a bi-directional transceiver disposed remotely from the transmitter (but within range of the transmitted signal) configured to receive the transmitted signal. The bi-directional transceiver circuit includes a line interface circuit configured to interface with a telephone line that is part of the public-switched telephone network (PSTN) to initiate a phone call over the telephone line. In this regard, the bi-directional transceiver further includes a controller configured to control both the reception of the transmitted signal and to control the communication of information over the telephone line. Finally, the system includes a central station remotely located from said bi-directional transceiver but being in communication with the bi-directional transceiver via the PSTN. The central station further includes a decoder configured to decode the instruction code.

As will be appreciated, the system summarized above provides an extremely robust and flexible platform for providing general purpose communications to a central location. In this regard, the term "general purpose" may also be referred to as an "open ended" platform that may be readily adapted for a wide variety of uses. The instruction code is a relatively small data value that may be decoded to define a wide variety of functions. For example, an instruction code a single byte (eight bits) in size may define up to two hundred fifty six different functions or instructions. Similarly, an instruction code two bytes in size may define over sixty-five thousand ($2^{16}$) functions or instructions.

In operation, the transmitter transmits the instruction code, perhaps along with other information, to a bi-directional transceiver located remotely, but generally nearby. The bi-directional transceiver, which will preferably be integrated into a pay-type public telephone (but which can be integrated into virtually any telephone or other device having access to the PSTN), receives the transmitted information including the instruction code, and communicates this information to a predetermined location over the PSTN. In this regard, the bi-directional transceiver is configured with a controller or other appropriate component to place a call to a predetermined phone number. Once the connection is established, the instruction code may be communicated (by modem) to the predetermined location. The predetermined location (which may be a central dispatch location) then decodes the instruction code to identify the function or instruction that corresponds to the code, and further initiates an appropriate response. The predetermined location may be a computer integrated on a wide area network such as the Internet. The computer may be configured to receive and compile vending machine status information that may be periodically accessed and acted upon accordingly. Alternatively, the computer may be configured with software that may further communicate critical conditions by way of Email, page, voicemail, etc., to an appropriate local service technician.

To illustrate the foregoing summary with a more concrete example, consider a vending machine that is running low on a particular product. A sensor within the vending machine may make this determination and signal the transmitter accordingly. The transmitter then broadcasts a transmission that includes an instruction code that corresponds to the low product alert. The bi-directional transceiver receives the broadcast transmission and communicates this information to a predetermined phone number. In this respect, the predetermined phone number may also be communicated from the transmitter to the bi-directional transceiver along with the instruction code. Assuming that the predetermined number corresponds to a central dispatch center, the center answers the phone call placed by the bi-directional transceiver and receives the instruction code. It then decodes the instruction code to determine that a particular product is low in the vending machine, and it may dispatch an appropriate service person to restock the machine. To this end, the center may be configured to generate an Email message or pager message to instruct appropriate service personnel of the supply request. As previously described, the central dispatch center may comprise a gateway connected to a wide area computer network such as the Internet. In this embodiment, the central dispatch center may take the form of an appropriately configured computer and database.

In accordance with this broad aspect of the invention, the transceiver includes a receiver circuit for receiving a signal transmitted from a remotely located transmitter or another transceiver. The transceiver also includes a transmitter that is configured to communicate information over a phone line, comprising a portion of the PSTN. Finally, the transceiver includes a controller that configures acquired information from the receiver circuit, initiates a phone call to a predetermined location, and transmits the acquired information over the PSTN to the called location.

In accordance with another aspect of the present invention, remotely located transmitters are replaced with RF transceivers. In accordance with this broad aspect of the invention, the RF transceivers include a receiver circuit for receiving a signal transmitted from a remotely located transmitter or transceiver. The RF transceiver also includes a transmitter that is configured to communicate with other RF transceivers. Integration of the RF transceivers into a number of closely located vending and/or service machines enables the RF transceivers to act as repeaters to transfer appropriate service condition information until the service condition signal reaches a transceiver that is integrated with the PSTN. Once the service condition signal reaches a transceiver that is integrated with the PSTN, the signal information is configured along with service information from other closely related machines and a call is initiated to the central station.

In accordance with another aspect of the present invention, one or more of the closely located remote RF transceivers are integrated with cellular transmitters. In accordance with this broad aspect of the invention, the cellular transmitters enable each individual vending/service machine configured in this manner to communicate directly with the central station via the local cellular network and the PSTN. The cellular transmitters permit the placement of vending/service machines in locations that do not have access to pay phones configured with a transceiver or locations that do not have telephone lines but are within a cellular telephone network's range.

In accordance with one aspect of the invention, the system includes a set of sensors disposed within a vending machine. As is known, the sensors are configured to detect a variety of service conditions, including products being low or out of stock, as well as, vending machine out of order conditions. The sensors generate output signals that are input to a transmitter or bi-directional transceiver. As described in previous embodiments, the signals received from the sensors are integrated into a message that includes an instruction code. The instruction code is communicated via transmitters or transceivers to a transceiver integrated with the PSTN. The transceiver includes circuitry capable of establishing a connection and communicating the instruction codes from multiple vending machines with a central station.

To illustrate the foregoing summary with an operational example, consider a vending machine that is running low on a particular product. A sensor within the vending machine makes this determination and signals the transmitter accordingly. The transmitter then broadcasts a transmission that includes an instruction code that corresponds to the low product alert. The transceiver receives the broadcast transmission and communicates this information to a predetermined phone number. In this respect, the predetermined phone number may also be communicated from the first transceiver to a second transceiver along with the instruction code. Assuming that the predetermined number corresponds to a central dispatch center, the center answers the phone call placed by the transceiver and receives the instruction code. It then decodes the instruction code to determine which particular product is low in the vending machine, and the center dispatches the appropriate service person to restock the machine. To this end, the center may be configured to generate an email message to route to an appropriate service person to handle the request. In similar fashion, a sensor may detect an out of order condition (one of any number of operational malfunctions). In the same way that a product low message (described above) is communicated to a central station, an out of order condition may be communicated as well. The central station, upon decoding the condition, may dispatch an appropriate service person (instead of a restock person) to service the vending machine.

In accordance with another aspect of the invention, the system includes an interface to the International Multi-Drop Bus Interface Standard (IMDBIS) adopted by the National Automatic Merchandising Association (NAMA) disposed within a vending machine. As is known, the IMDBIS is configured to detect a variety of service conditions, including products being low or out of stock, as well as, vending machine out of order conditions. The IMDBIS generates output signals that are input to a bi-directional transceiver disposed at (typically within) the vending machine. The transceiver includes circuitry that encodes the signals received from the sensors into a message that includes an instruction code. As described in previous embodiments, the system relays the instruction code across transmitters and transceivers until the instruction code reaches a transceiver with access to the PSTN to establish a connection with a central station. As described in previous embodiments, the central station appropriately responds to the communicated instruction code.

In accordance with another aspect of the invention, a method is provided for performing an automated service request. In accordance with this aspect of the invention, the method includes the steps of sensing a service condition and notifying a first transceiver of the service condition. The method then transmits an information signal from the first transceiver to a remotely-located second transceiver, wherein the information signal includes a function code that specifies the service condition. Thereafter, the method places a call from the second transceiver to a central station over a phone line comprising a part of the PSTN and communicates at least the function code and identity of the first transceiver to the central station. Finally, the method decodes the function code at the central station to identify the service request.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 5 is a diagram illustrating the look-up table of FIGS. 4A and 4B showing relevant vending/service machine status.

DETAILED DESCRIPTION OF THE PREFERRED EMBODIMENTS

Figure 1:
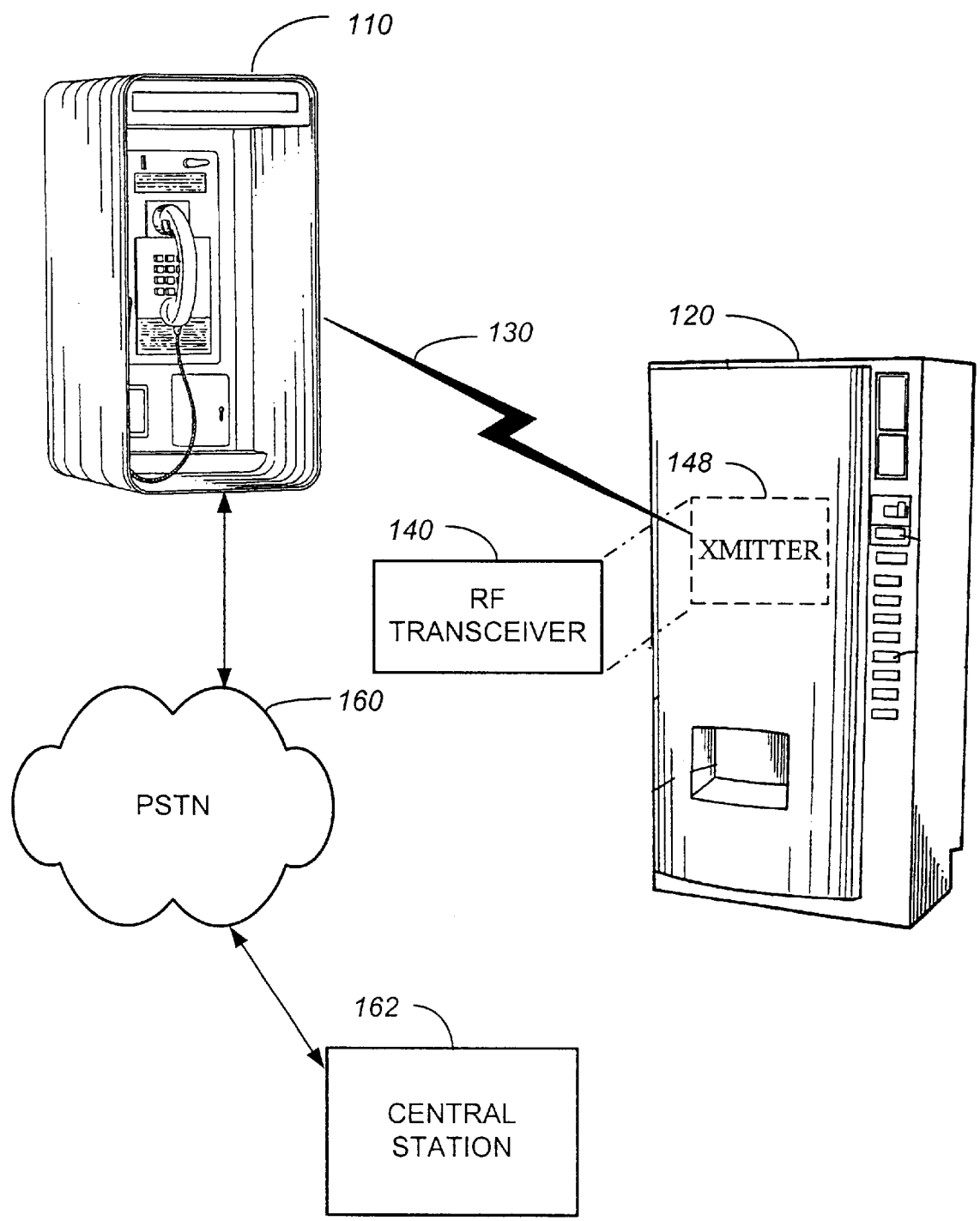
FIG. 1 is an illustration of a vending machine service request system constructed in accordance with one embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1, which illustrates a typical operational environment of the present invention. Specifically, the environment illustrated is one which provides operational status monitoring and automated servicing of a vending machine 120. In this regard, a vending machine 120, such as a soda dispensing machine, includes an internal transmitter 148 or alternatively, an internal RF transceiver 140, that communicates information via RF signal 130 to a nearby transceiver which may be located in pay-type telephone 110. However, and as will be appreciated, the transceiver may be incorporated into a variety of devices, so long as it has access to a phone line, preferably one forming a part of the PSTN 160.

Internally, the RF transceiver 140 includes receiver circuitry for receiving the transmitted signal 130 and a transmitter for communicating data via the PSTN 160 to a central station 162. In this regard, the central station 162 may be a central dispatch location, that is configured to dispatch service personnel to attend to the vending machine 120. As will be appreciated, the vending machine 120 may encompass a wide variety of devices, in addition to a soda dispensing machine. For example, the vending machine 120 may include a snack dispensing apparatus, a candy dispensing apparatus, a cigarette dispensing apparatus, a newspaper dispensing apparatus, an ice dispensing apparatus, among many other product or service dispensing devices.

A variety of sensors may be integrated via sensor circuitry to RF transmitter 148, or alternatively, RF transceiver 140 in vending machine 120 for detecting a variety of events. For example, detecting whether the machine 120 is low on a given product, or out of a product; determining whether the machine is out of change; determining if the machine has taken in a predetermined amount of money, which should be emptied; detecting if the machine is out of order; etc. These, and other events sensed within the vending machine 120 may be communicated to the transmitter 148, which then formats the data in a way that it may be readily understood by the transceiver integrated within telephone 110. The transmitter 148 transmits the data (preferably via RF link 130) to the transceiver disposed within the telephone 110. This information, in turn, is communicated from the transceiver via PSTN 160 to the central station 162. Based upon the information received, the central station 162 will institute an appropriate response.

For example, if the information received is a notification that one or more of the products in the vending machine 120 is either low or out of stock, then a first person may be dispatched to restock the machine. If, on the other hand, the information received is a notification that the machine is out of order, then a second person (service person) may be dispatched to service the machine.

Figure 2:
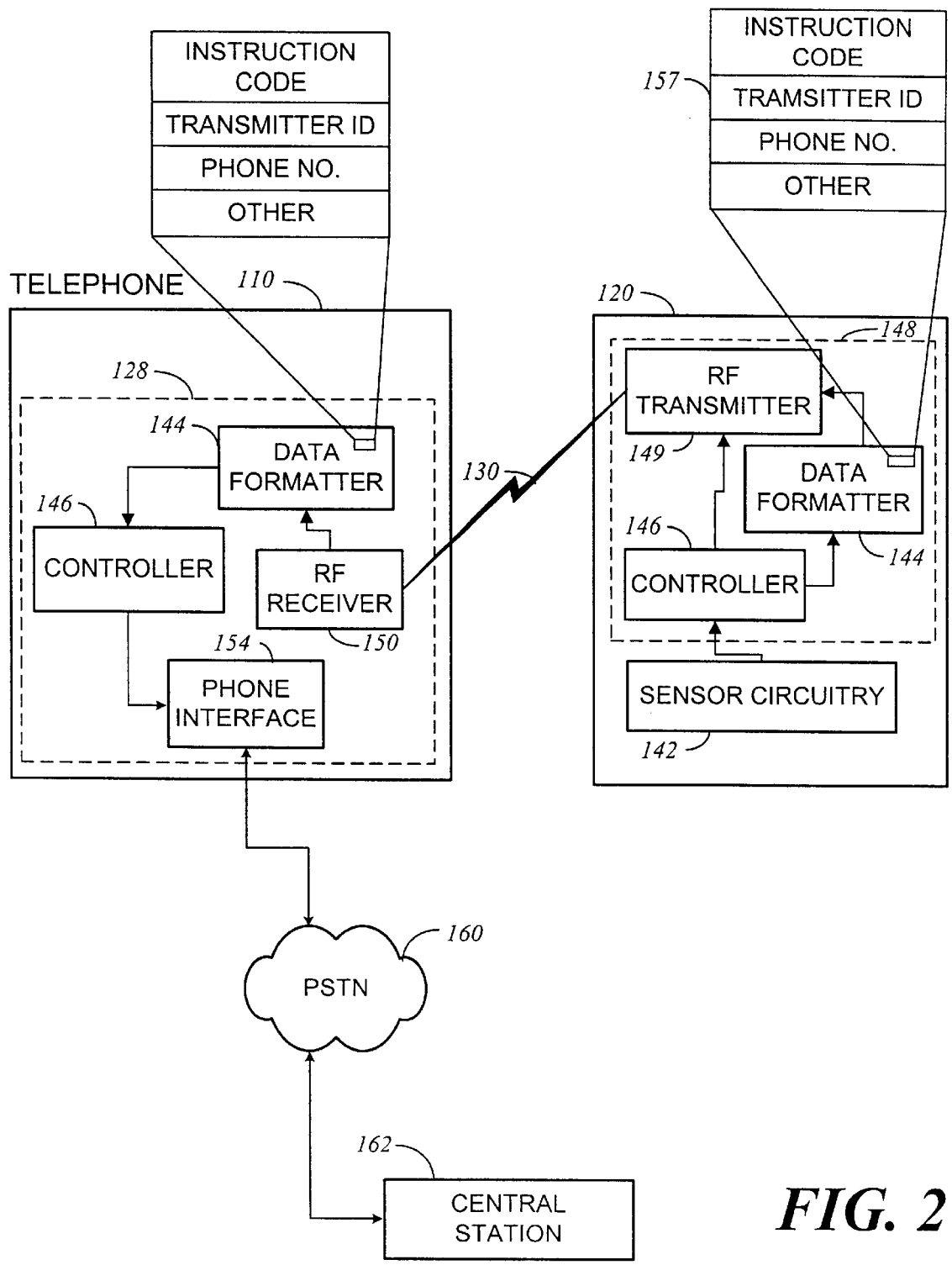
FIG. 2 is a more detailed block diagram of the system illustrated in FIG. 1.

Having broadly described the vending machine service environment, reference is now made to FIG. 2, which illustrates the circuitry within the vending machine 120, as well as the circuitry within the telephone 110, for carrying out the inventive aspects. In this regard, various sensors are disposed within the vending machine 120. These include one or more product sensors configured to determine whether a given product is either low or out of stock. The sensors may also include operational sensors configured to detect machine malfunctions (e.g., out of order conditions) or other conditions relating to the operation of the vending machine 120. Outputs of the various sensors are directed to sensor circuitry 142, which provides an appropriate input signal to the controller 146 and the data formatter 144 which process the signal before forwarding the sensor information signal to the RF transmitter 149.

Ultimately, the output of the sensor circuitry 142 is directed to a controller 146, which may comprise dedicated circuitry, or may alternatively comprise general purpose programmable hardware, such as a microprocessor or microcontroller. The controller 146, in essence, handles the processing of most of the functional operations carried out at the vending machine 120.

In this regard, and although the invention is not limited to this embodiment, the transmitter 148, or alternatively the RF transceiver 140, of the preferred embodiment is characterized by an open-ended architecture that is configured to receive an encoded instruction. This encoded instruction may be decoded to identify specific and unique functions and/or instructions. For example, one code may uniquely describe the event of the vending machine 120 running out of a certain product. Although this code may be meaningless to the RF transceiver 140, when decoded by the central station 162, an appropriate action may be taken. Thus, a first vending machine company may utilize a given code to define a certain event relevant to the vending machine 120, while a second vending machine enterprise may utilize the same code to define a completely different event. Nevertheless, the same general purpose transceiver may be used to implement both embodiments.

In keeping with a description of the vending machine 120, the controller 146 is preferably configured to receive sensor outputs and compose the appropriate instruction code for transmission to the transceiver 128 located within telephone 110. A data formatter 144 may also be provided within the vending machine 120. As the name implies, the data formatter 144 formats the data for transmission to the transceiver 128. It will be appreciated that, in addition to the instruction code described above, it may also supply other information for transmission. As illustrated by the block 157 (exploded from the data formatter 144), information such as a transmitter identification code, and a destination phone number may also be included in the information transmitted to the transceiver 128. In this regard, the transmitter identification code uniquely identifies the transmitter 148, which code may be decoded at the central station 162 to identify the specific vending machine that created a received message. That is, the instruction code may inform the central station 162 as to the particular service need of the vending machine 120, and the transmitter identification code may inform the central station 162 of the particular vending machine 120, its location, and its need for service.

Finally, the data formatter 144 may also include the phone number of the central station 162; namely, the phone number that the transceiver 128 is to dial over the PSTN 160. In this way, a generic (open-ended) transceiver 128 may be utilized and installed in mass within public, pay-type telephones, by the service provider. Thus, various companies may then utilize specially configured transmitters 148 to communicate with the general purpose transceiver 128 to communicate a wide variety of information to central locations, defined by the transmitters 148.

Having described the functional components of transmitter 148 disposed within vending machine 120, reference is now directed to telephone 110 illustrated in FIG. 2. In this regard, telephone 110 may be integrated with a transceiver 128. The transceiver 128 may comprise a RF receiver 150, a data formatter 144, a controller 146, and a phone interface 154.

RF receiver 150 may be configured to receive RF link 130 from a transmitter 148, or alternatively a RF transceiver 140 disposed within vending machine 120 as previously described. RF receiver 150 may process the received information signal and forward a demodulated signal to data formatter 144. Data formatter 144 formats the data for processing by controller 146, which may forward the received instruction codes, transmitter identification, the central station phone number, and other information to phone interface 154. Phone interface 154 is configured to initialize a call via PSTN 160 to central station 162. Once phone interface 154 verifies that a call has been initialized, a data transmission is forwarded to central station 162.

Figure 3:
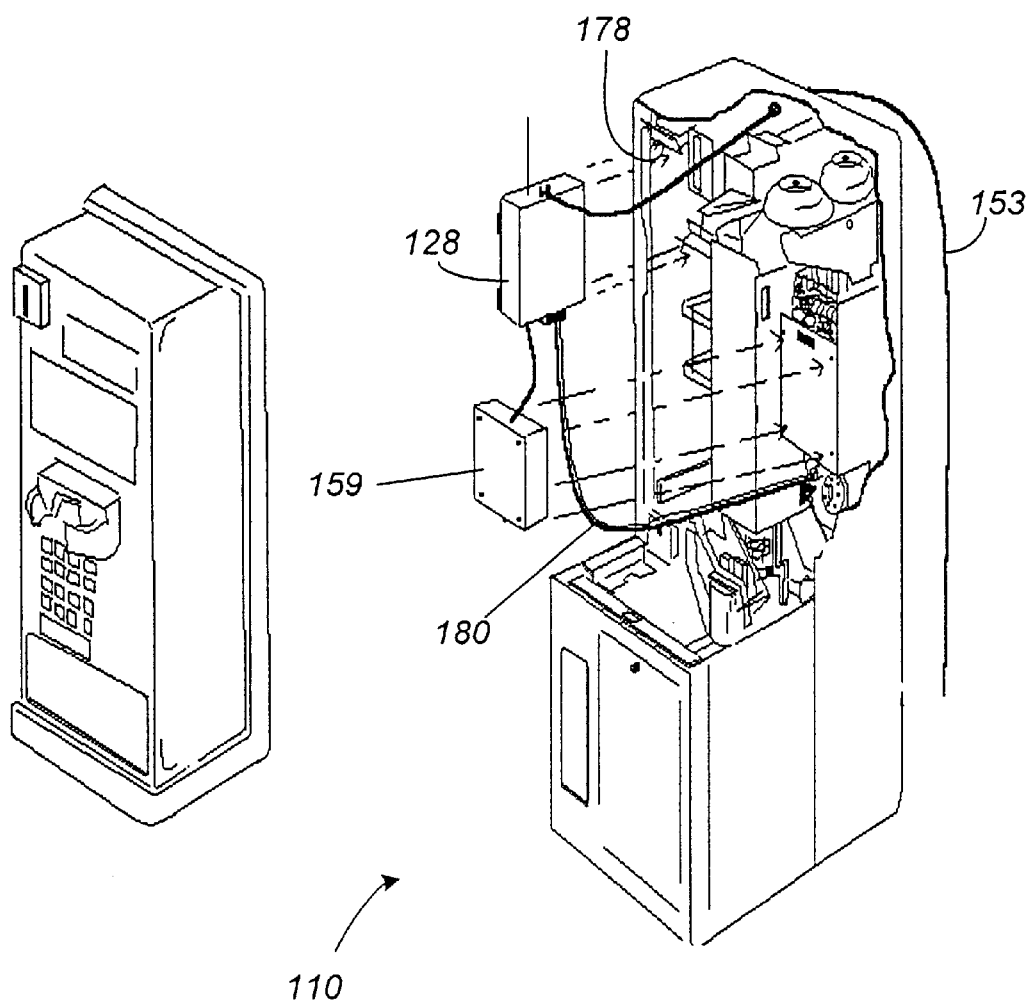
FIG. 3 is an exploded perspective view of a telephone housing a transceiver constructed in accordance with the invention as shown in FIG. 1.

Having described a system that forwards information from a vending machine 120 to a central station 162 via a RF transmitter 148, or alternatively, a RF transceiver 140, reference is now made briefly to FIG. 3, which is an exploded perspective view of a telephone 110 incorporating a transceiver 128 constructed in accordance with the present invention. In this regard, the transceiver 128 may be provided in a single module having an associated battery pack 159. Alternatively, the transceiver 128 could be designed to operate from the power supplied to the telephone. As illustrated, the transceiver 128 may be configured to snap into a space provided in the telephone.

An external wire 153 may be provided to act as an antenna for the transceiver 128. Alternatively, a smaller internal antenna may be provided. As will be appreciated by one of ordinary skill in the art, the output from the transceiver is via cable 180, which may terminate at an RJ11 connector, having Ring, Tip, and Common (RTC) conductors.

Figure 4A:
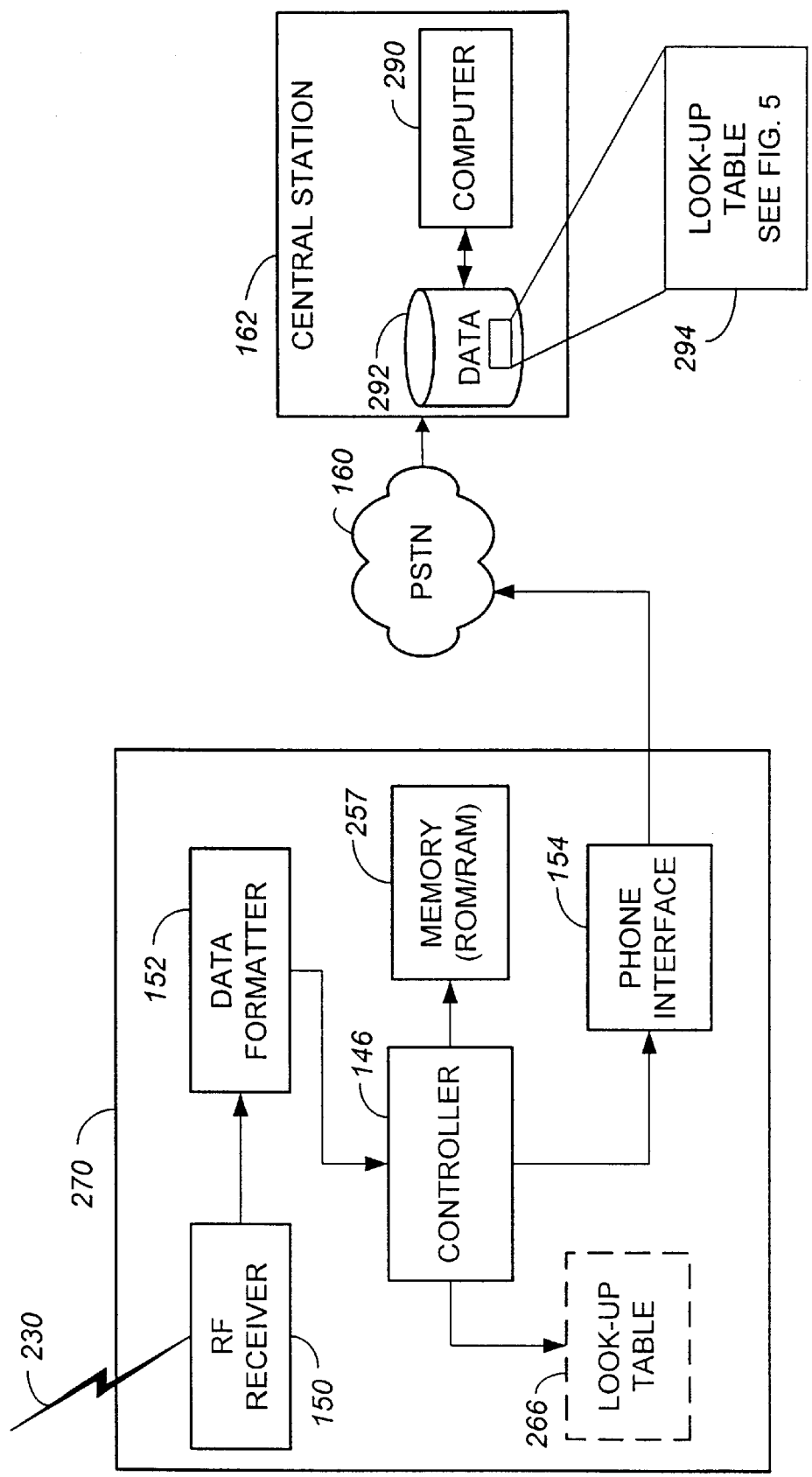
FIG. 4A is a block diagram illustrating a transceiver constructed in accordance with the present invention in communication with a central monitoring station.

Having described how a pay-type telephone may be modified to receive a RF transceiver 128 consistent with the present invention, reference is now directed to FIG. 4A. In this regard, FIG. 4A illustrates (generically) a system constructed in accordance with the present invention. The drawing more specifically illustrates an open-ended transceiver 270 constructed in accordance with the present invention. In this regard, the transceiver 270 includes a RF receiver circuit 150 that is configured to receive an electromagnetic signal (e.g., RF, optical, etc.). As described above, this signal includes an instruction code, and possibly other items such as a phone number, a transmitter identification code, etc. A data formatter 144 is provided in connection with a controller 146 to further format a signal that is to be output from the transceiver 270 to the central station 162. In this regard, additional information may be added to the signal that is transmitted to the central station 162.

For example, a transceiver identification code may be added to the signal. Although the central station 162 may decode the transmitter identification code (if provided) to identify, for example, a geographic location of a transmitter, in environments where the transmitter is mobile (i.e., handheld), a transmitter identification code may be of no use in identifying a geographic location. In such an environment, the addition of a transceiver code will facilitate the identification of the transmitter location (recognizing that the transmitter will be located in the proximity of the transceiver 270).

The controller 146 preferably performs the overall control and synchronization of functional operations within the transceiver 270. In this regard, the controller 146 may be a general purpose microprocessor or micro-controller. If so, memory 257 may be provided to store programmable code for controlling the operation of the controller 146. Phone interface 154 may also be provided for interfacing to the PSTN 160. Telephone 110 (not shown) typically has circuitry configured to interface with the local loop of the PSTN 160. Phone interface 154 within the transceiver 270 is designed to interface with this typical/standard telephone circuitry. The specific implementation of the circuitry within phone interface 154 will be appreciated by persons skilled in the art and need not be described in detail herein.

A look-up table 266 is also illustrated in FIG. 4. It is illustrated in dashed line to represent that it may be optionally provided within the transceiver 270. Consistent with the broader concepts of the invention, in certain embodiments, it may be desired to provide a more application specific transceiver 270. In such embodiments, a look-up table 266 may be provided within the transceiver for decoding information such as the instruction code, the transmitter identification code, or any other information that may be transmitted from the transmitter. The specific use of such data will necessarily be application specific and controlled by the controller 146, and need not be described herein.

At the central station 162, a computer 290 may be provided to receive and process data received from the transceiver 270 via the PSTN 160. In this regard a database 292, including a second look-up table 294, may be provided. Since the present invention is directed to the transceiver 270, a variety of platforms may actually be implemented at the central station 162. It will be appreciated, however, that with a computer implementation, an extremely flexible and robust operation may be achieved. For example, the response of the central station 162 to various incoming messages may be programmed to vary depending upon the contents of the message.

By way of illustration, suppose an incoming message identifies a particular vending machine that is out of a given product. The computer 290, upon recognizing this condition, may alert the appropriate person that is to restock the machine. To this end, the computer may so notify the person by sending the person an email message. Similarly, suppose the computer recognizes the incoming message as identifying that a particular vending machine is out of order, then the computer 290 may alert a different person that the machine is in need of technical service. In order to identify the contents of the various incoming messages, the central station 162 may employ the second look-up table 294, like that illustrated in FIG. 5.

Figure 4B:
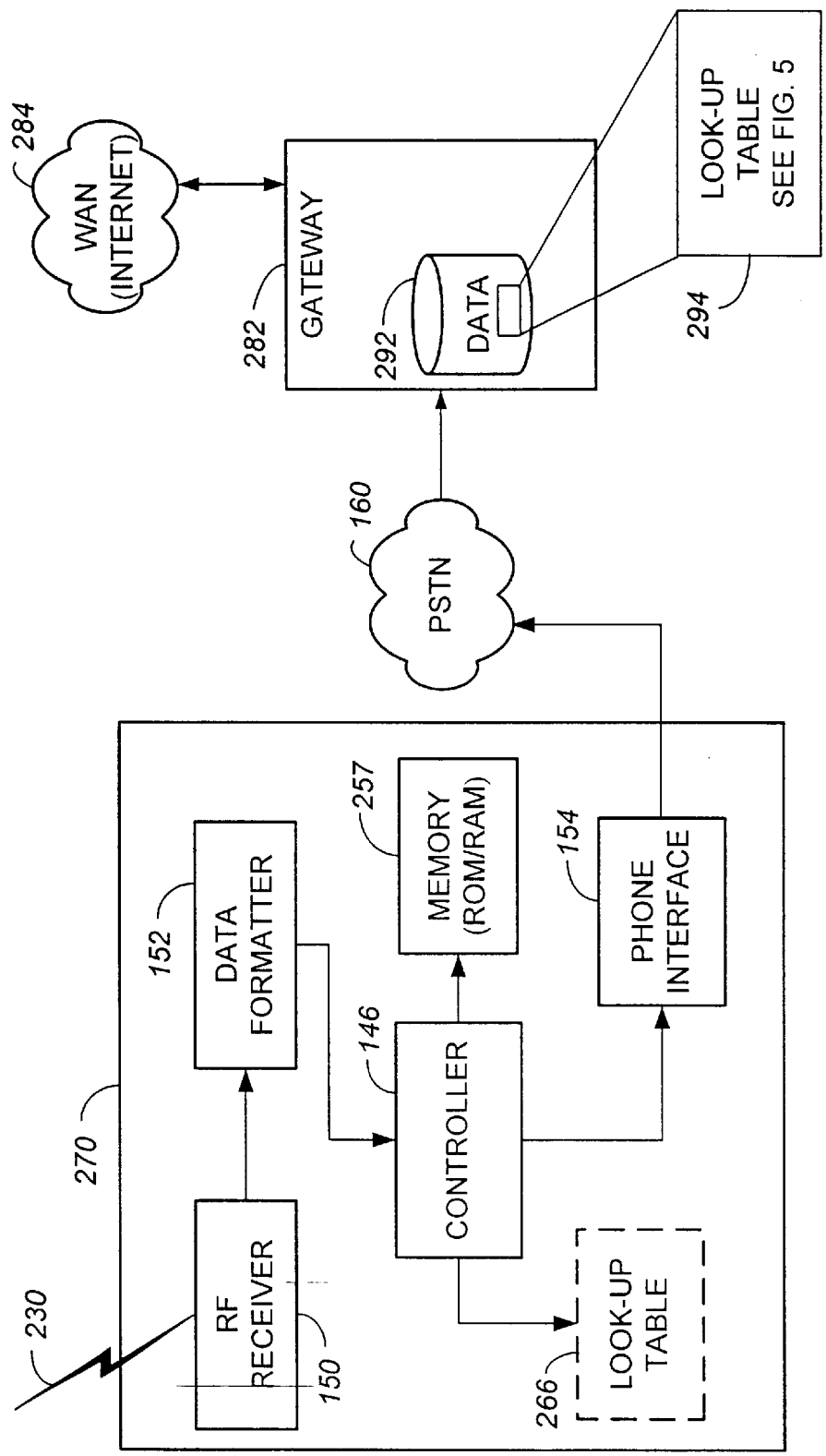
FIG. 4B is a block diagram illustrating the transceiver of FIG. 4A in communication with a wide area computer network via a gateway computer.

Having described a generic system with a transceiver in regard to FIG. 4A, reference is now directed to FIG. 4B. In this regard, FIG. 4B illustrates another embodiment of the system introduced in FIG. 4B. The drawing more specifically illustrates that the central station 162 of FIG. 4A make take the form of a Gateway computer 282 further integrated with a wide area network (WAN) 284. As previously described in relation to FIG. 4A, an open-ended transceiver 270 constructed in accordance with the present invention may be used to communicate an instruction code and other information such as a phone number, Internet protocol address, a transmitter identification code, etc. to a remote location. As illustrated in FIG. 4B, the remote location may be a gateway computer 282 configured to interface with a WAN 284, such as the Internet.

To this end, the gateway computer 282 may be configured to forward the instruction code, a transmitter identification code and other information such as one or more transceiver identification codes, etc. to a computer identified via an Internet protocol address in the transmitter data transmission. In this way, an Internet addressed computer can receive and format various messages over a wide geographic area for monitoring and retrieval by anyone with access to the particular Internet computer. The combination of local gateway computers 282 with one or more computers integrated to the WAN 284 provides a redundant and robust distributed network for managing and servicing vending and service machines. As previously described in relation to FIG. 4A, and applied to the configuration of FIG. 4B, the Gateway computer 282 may responsively alert dedicated persons that a particular vending or service machine in the reporting network is in need of technical service via any Internet connected reporting device. Similarly, the Gateway computer 282 may responsively alert an appropriate person that a particular vending machine that is out of or running low on a given product. Either the Gateway computer 292 or an Internet connected reporting device, upon recognizing this condition, may alert the appropriate person to restock the machine. In order to identify the contents of the various incoming messages, the gateway computer 282 may employ the second look-up table 294, like that illustrated in FIG. 5.

Referring to FIG. 5, a look-up table 294 is illustrated. Although the look-up table 294 may take on a wide variety of forms, the table illustrated in FIG. 5 includes two columns of data. The first column is a listing of the various instruction codes that may be transmitted by the transmitter 148 to the transceiver 270, and forwarded by the transceiver 270 to the central station 162. The second column contains the specific functions or instructions that correspond to the transmitted/ received instruction code. Thus, by looking up the instruction code within the look-up table 294, the computer 290 at the central station 162 can readily identify the function or instruction that is to be executed. For example, one code may indicate that a particular vending machine "n" is low on a specific product "X." Another code may indicate that a particular vending machine's internal temperature is greater than a set threshold temperature. Yet another code may indicate that an industrial trash compactor "m" is in need of service.

Thus, in one embodiment, the instruction codes themselves may be encoded to uniquely identify particular machines or persons. More particularly, in the illustrated embodiment, instruction code 00000001 identifies that vending machine "n" is low on product "X." In yet another embodiment, this same code may indicate that a vending machine's 120 inventory is low on a particular product. Additional codes may be generated at the transmitter 148 and decoded at the central station 162 to provide this more specific information. For example, a transmitter identification code may be decoded by the central station 162 to identify the specific vending machine that is low on product. Likewise, an additional code, such as a product code, may be generated by the transmitter 148 to identify the specific product that is low. Thus, in such an alternative embodiment, multiple look-up tables 294 may be utilized at the central station 162.

Figure 6:
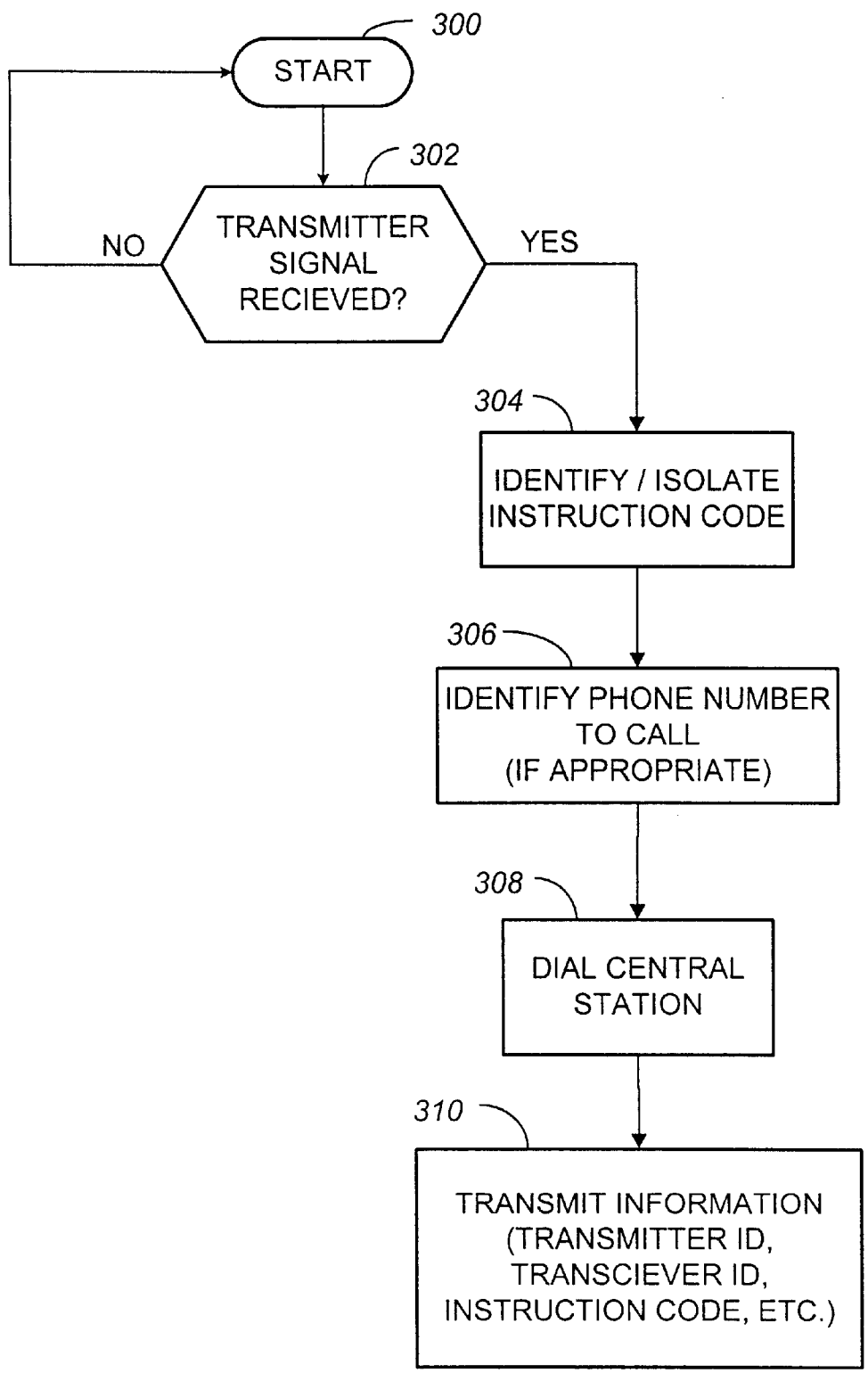
FIG. 6 is a flowchart illustrating the top-level functional operation of a transceiver constructed in accordance with one embodiment of the present invention.

Having described the transceiver 270 of the present invention, and illustrated its use in differing embodiments, reference is now made to FIG. 6, which is a flowchart that depicts the top-level functional operation of a transceiver 270 constructed in accordance with one embodiment of the invention. In this regard, processing flow starts with step 300 designated "start." Next, in step 302, the transceiver 270 awaits the receipt of a signal transmitted from a transmitter 148. Upon receipt of a transmitted signal, the transceiver 270 (through the controller 146 and data formatter 144) looks to identify and/or isolate the instruction code in step 304. The transceiver 270 also looks, if appropriate, to identify a phone number of a central station in step 306. Next, the transceiver 270 dials the corresponding central station in step 308, establishing a connection over the PSTN 162.

In this regard, the transceiver may be configured to seize the phone line. Thus, anyone making a call or any call currently in progress would be disconnected. Alternatively, the transceiver 270 (through the controller 146) may be configured to test the phone line for its present availability. If a call is in progress, the controller 146 may store the message received from the transmitter 148 and await the availability of the phone line. Once the phone line becomes available, then the transceiver 270 may assume the line and place its call. In yet a further embodiment, the transceiver 270 may be configured to implement simultaneous voice/ data technology to place the phone call to the central station 162 without interrupting any ongoing call. In an even more complex embodiment, a different service may be provided in connection with the telephone 110 through which to place the call. For example, the telephone 110 may also be equipped with an ISDN service or a DSL service, through which the data transmitted is communicated. As is known, communication through such a service may be made without interruption to a call ongoing in the POTS frequency band.

Finally, the transceiver 270 transmits the message, including the instruction code, and, if relevant, the transmitter identification code, the destination phone number, the transceiver identification code, etc. in step 310.

Figure 7:
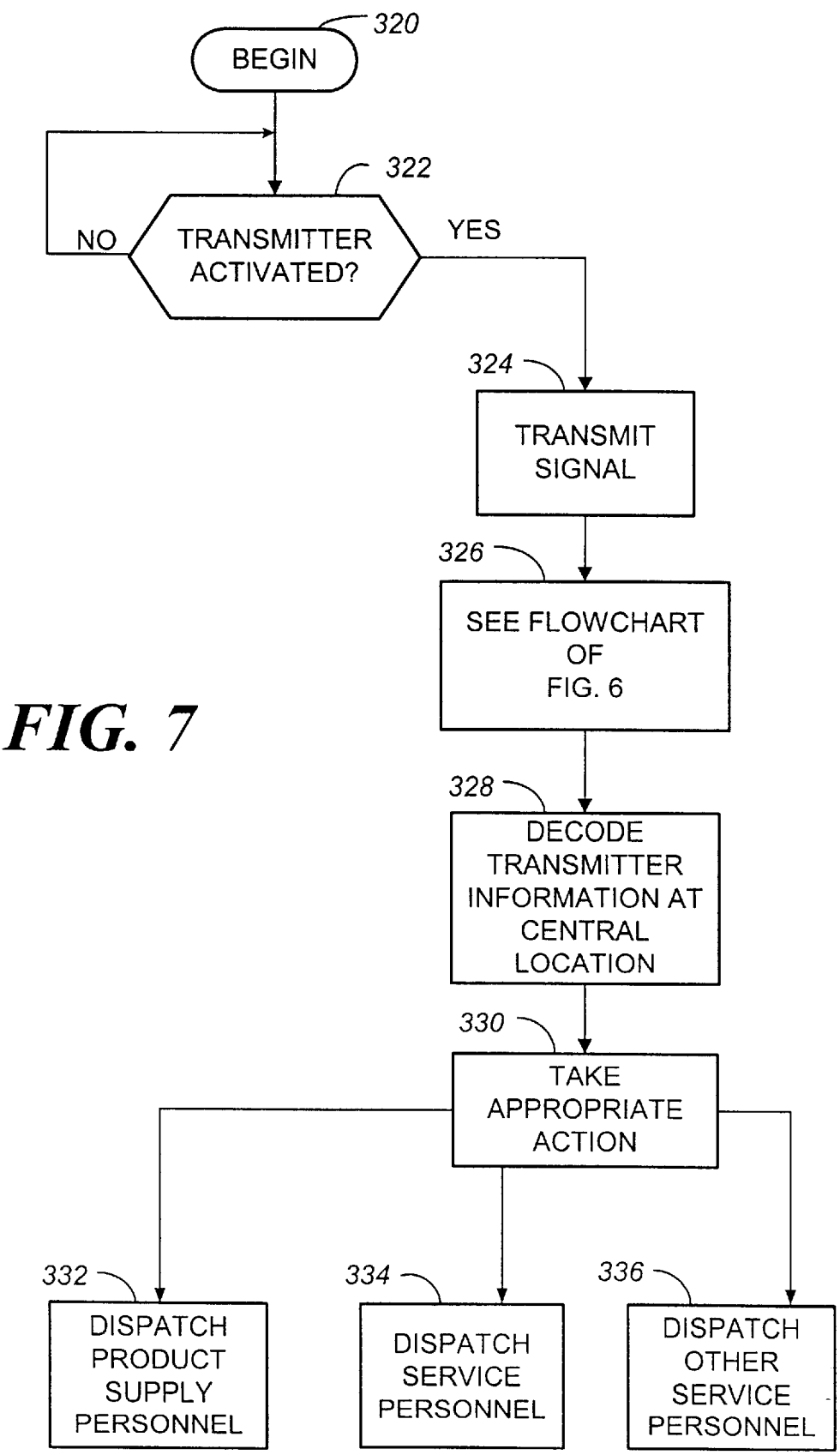
FIG. 7 is a flowchart illustrating the top-level functional operation of a system constructed in accordance with one embodiment of the present invention.

Referring now to FIG. 7, a flowchart is shown that illustrates the top-level functional operation of a system, in accordance with one aspect of the invention. In this regard, the system remains in an idle state, until the transmitter 148 becomes activated in step 320. This may be accomplished by a periodic check for a trigger condition as illustrated in step 322. Upon activation, the transmitter 148 transmits a signal in step 324, including at least an instruction code in step 326. Thereafter, the transceiver 148 operates in accordance with the flowchart of FIG. 6. In step 328, the central station 162 then decodes information received via the PSTN 160 (specifically, decoding the instruction code).

Based upon the decoded instruction code (and perhaps other codes in some embodiments), the central station 162 initiates an appropriate action in response as shown in step 330. For example, in response to a distress call, the central station 162 may dispatch product supply personnel as shown in step 332. In response to a service request, the central station 162 may dispatch service personnel as shown in step 334. In response to other types of messages or requests, the central station 162 may dispatch other personnel or take other appropriate action as shown in step 336.

Figure 8:
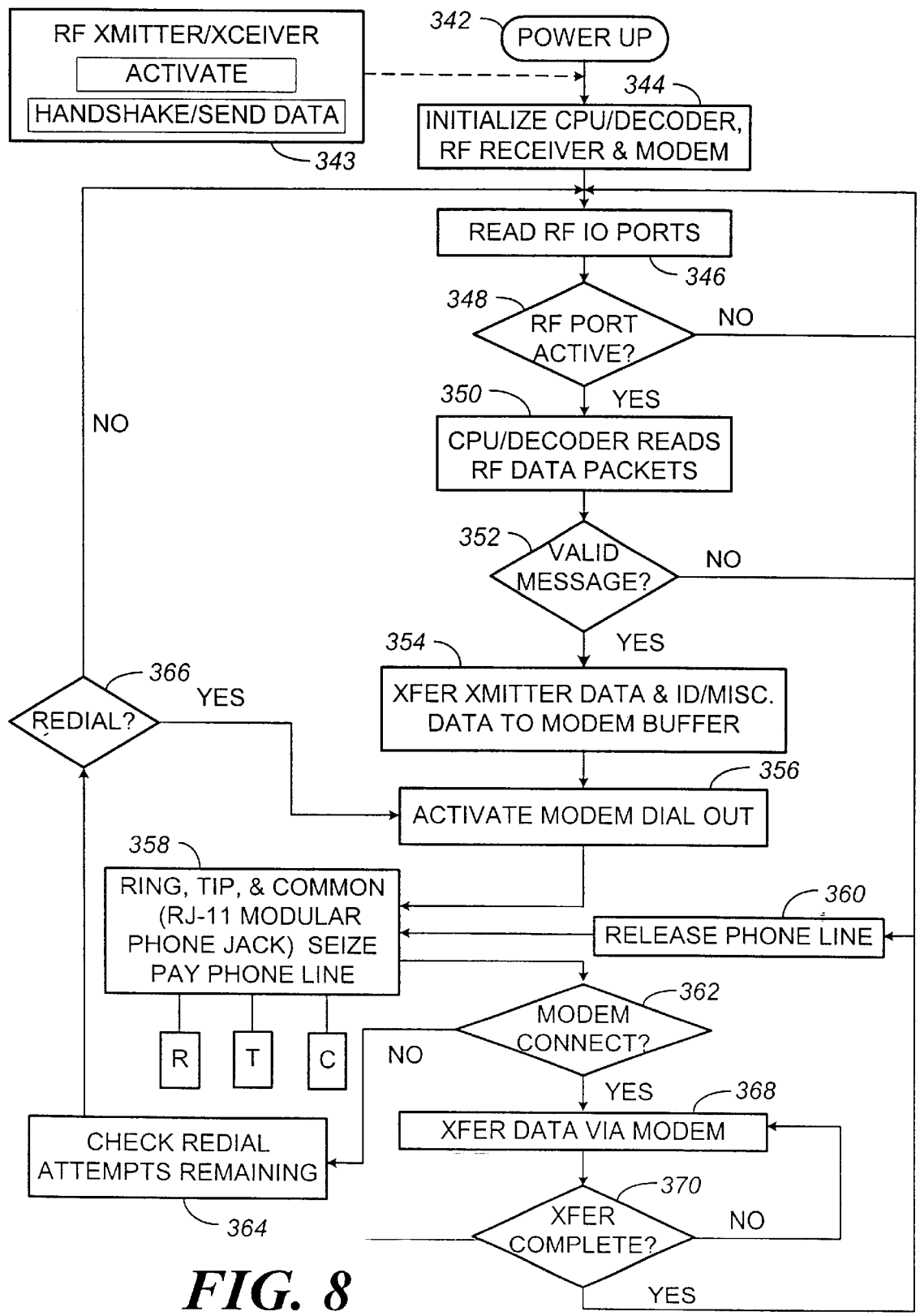
FIG. 8 is a flowchart illustrating the functional operation of a transceiver integrated within a pay phone host in accordance with one embodiment of the present invention.

Having described the top-level functional operation of the invention, reference is made to FIG. 8, which is a flowchart that depicts the operation of the system from more of a hardware level, as opposed to a functional level. FIG. 8 is a flowchart illustrating the functional operation of a transceiver integrated within a pay phone host in accordance with one embodiment of the present invention. The flowchart of FIG. 8 will not be described herein in detail, as a person of ordinary skill in the art will appreciate the system operation simply from a review of the flowchart and the nomenclature provided therein.

Transceiver operation begins in step 342 designated, "power up." Having received a triggering signal as indicated in step 343, the transceiver responds by initializing each of its functional components as illustrated in step 344. Having initialized its functional components, the transceiver reads data from its RF input/output port in step 348. Next, in step 348, the transceiver checks if the RF port is active. If no, the transceiver returns processing to step 346 where it reads the RF input output port. If yes, data read from the RF port is forwarded to the CPU/decoder functions in step 350.

Next, in step 352, the transceiver performs a validity check on the message format of the data received and processed in the preceding steps. If the message does not meet the parameters of a valid message, the transceiver returns processing to step 346. If the message is valid, the transceiver transfers the transmitter data, identification code, and miscellaneous data received to the modem buffer in step 354.

Having formatted the outgoing message in the preceding steps, the transceiver activates a modem dial out in step 356. The modem dial out is accomplished by manipulating the ring, tip, and common circuits as illustrated in step 358 in order to seize the phone line. Having performed step 358, the transceiver next performs a check in step 362 to determine if the modem is properly connected to the central station 162 via the PSTN 160. If the determination in step 362 is no, the transceiver continues by adjusting a redial counter in step 364 and determining whether the modem should redial the central station in step 366. If the determination to redial is affirmative, the transceiver returns processing to step 356 (activate modem dial out).

If the determination in step 362 was that a valid modem call was established, the transceiver continues processing by forwarding the formatted data stream via the modem in step 368. Having activated the data transfer, the transceiver periodically performs a check in step 370 to determine if the data transmission is complete. If the data transmission is not complete, processing returns to step 368. If it is determined in step 370 that the data transmission has completed, the transceiver returns processing to step 346 where the transceiver reads the RF input/output ports.

Figure 9:
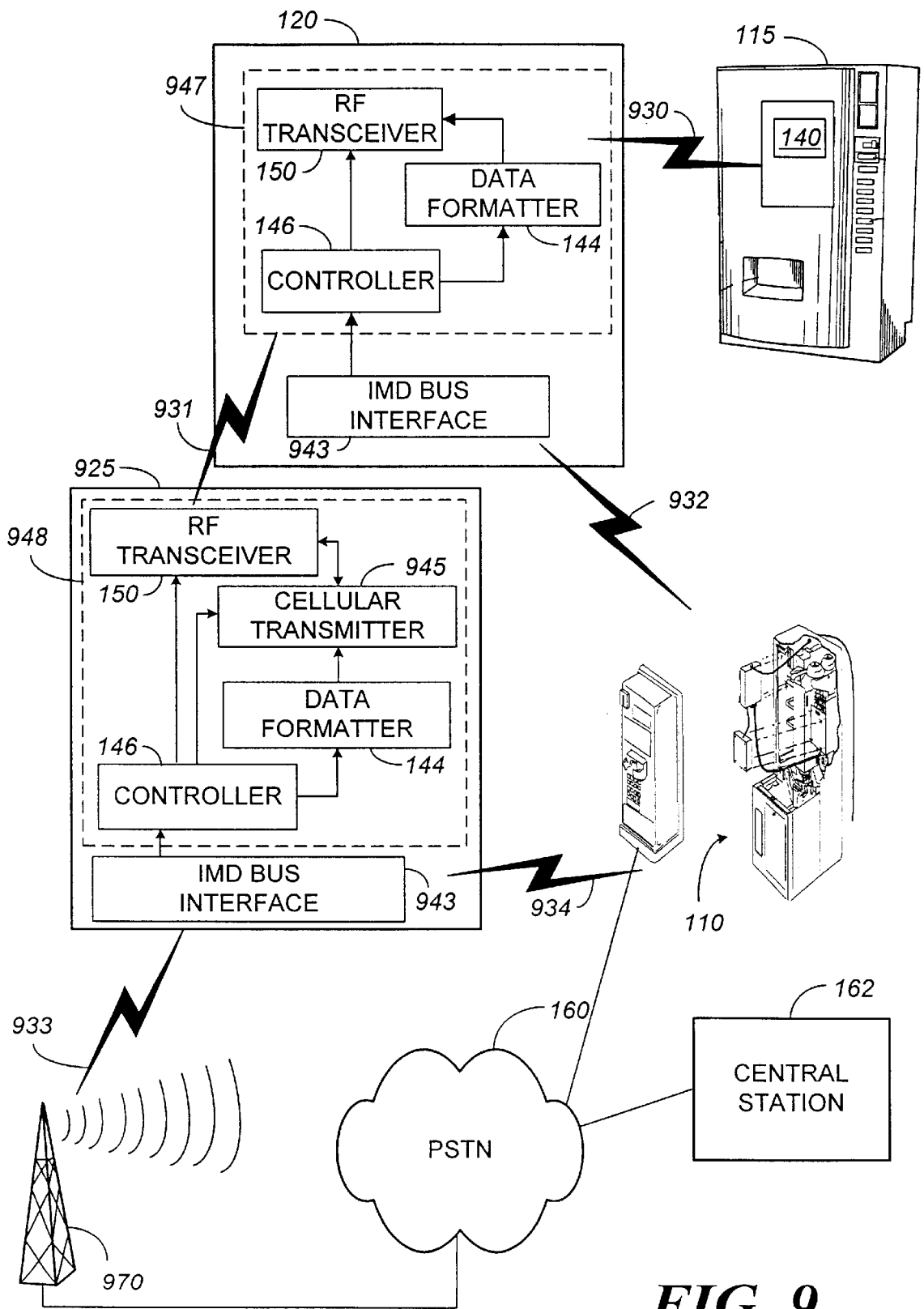
FIG. 9 is a block diagram illustrating a vending machine service request system constructed in accordance with several embodiments of the invention.

Having described the operation of a transceiver integrated within a telephone with regard to FIG. 8, reference is now directed to FIG. 9. FIG. 9 illustrates the top-level functional operation of a system, in accordance with one aspect of the invention.

In this regard, the system integrates a multiplicity of transceivers 140, 947, and 948 integrated with vending/service machines 115, 120, and 925 to communicate via multiple RF links 930, 931, 932, 933, and 934 with the PSTN 160 and ultimately the central station 162. Since the IMD bus is well known and specified by standards, it need not be described herein. For at least the same reason, persons skilled in the art will understand how to implement an IMD bus interface 943. Therefore, such an interface need not be described herein. Vending/service machine 120 is configured with an IMD bus interface 943 to enable the processing of machine status information via controller 146 and data formatter 144 for transmission by RF transceiver 150 via RF links 931 and 932 to devices configured to access the PSTN 160. Vending/service machine 925 is configured with a cellular transmitter 945 to enable access to PSTN 160 via local cellular network 970 via RF link 933. In an alternative mode, vending/service machine 925 can relay status information from proximally located vending/service machines 115 and 120 via transceiver 150 and RF link 934 to a proximally located pay phone 110 configured with a transceiver (see FIG. 3).

Figure 10:
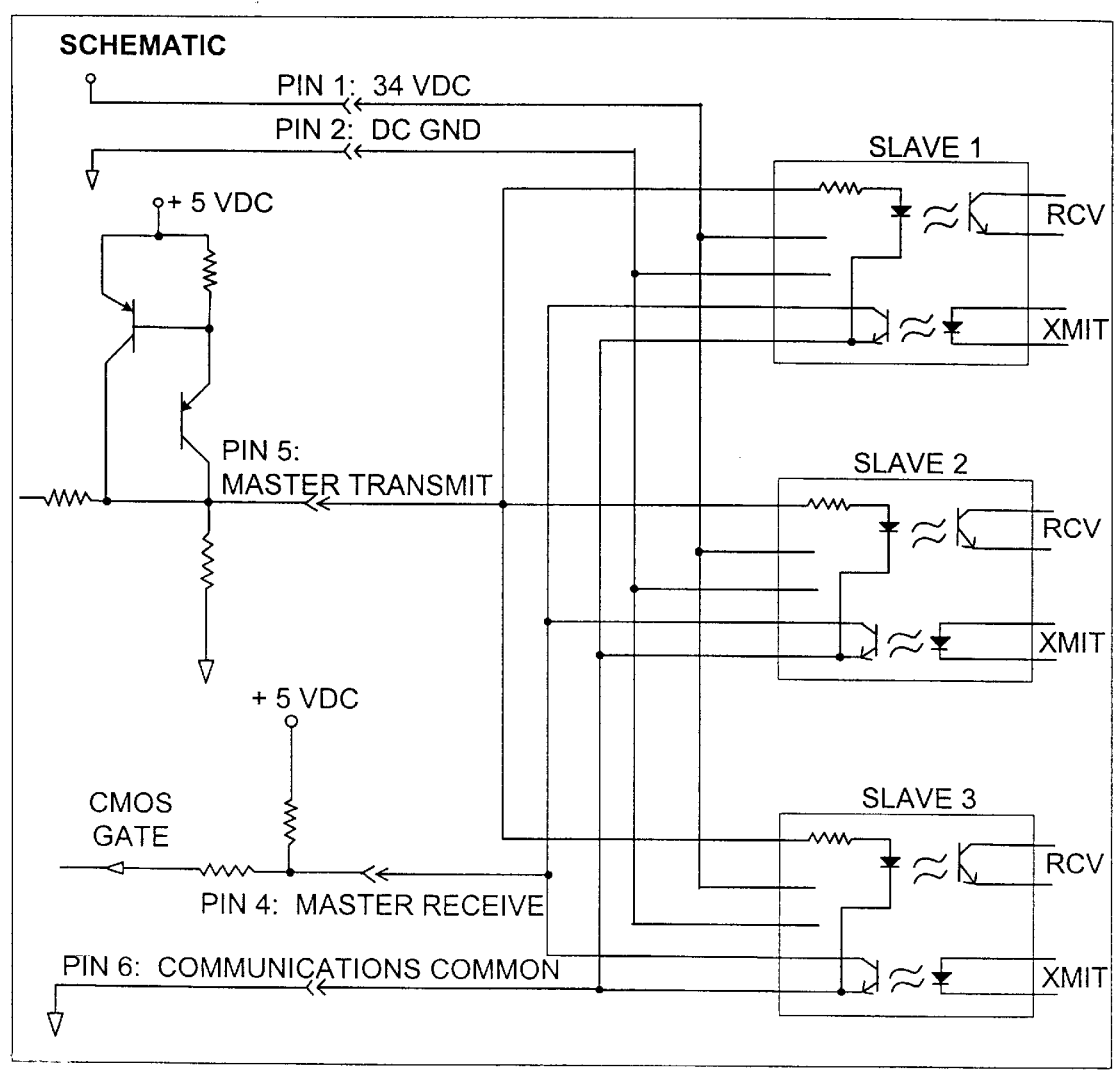
FIG. 10 is a schematic diagram illustrating the interface between a transceiver and the IMDBIS.

Having described the top-level functional operation of the invention, reference is made to FIG. 10, which is a schematic diagram illustrating the details of the electrical interface necessitated by the IMD bus interface. It will be appreciated by those skilled in the art that the Multi-Function General Purpose Transceiver can be readily configured to tap into the IMD bus and thus can enable the transfer of product supply, machine status, cash validation, card reading, and peripheral communications with one or more remote locations.

Although it is preferred to implement the present invention through an open-ended transmission protocol, as defined above, it will be appreciated that the concepts and teachings of the present invention are not so limited. In fact, for purposes of the present invention, the message transmitted by the multiple transceivers may be as simple as an instruction code that defines a condition of the vending machines 115, 120, and 925, that a central station 162 may decode and act upon. In such an embodiment, each of the multiple transceivers 115, 120, and 925 may be specifically configured to establish a phone connection with a predetermined central station 162.

In yet another embodiment, a RF transmitter may encode a message that transmits both an instruction code and a phone number used to establish communications between the RF transmitter and a central station. Such an embodiment, allows a generic transceiver to be utilized, such that multiple enterprises may utilize this common, generic transceiver for various applications. Consistent with these broad concepts, a variety of other configurations may be employed as well.

Indeed, the foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Therefore, having thus described the invention, at least the following is claimed:

1. A system for monitoring a vending machine comprising:

a plurality of sensors configured to create status signals;

a controller configured to create a first encoded signal in response to the status signals, wherein the first encoded signal includes an instruction code corresponding to a service request, the service request responsive to a status condition provided by at least one of the sensors;

a transmitter configured to transmit a first transmitted signal containing a second encoded signal responsive to the first encoded signal and a transmitter identifier; and a first transceiver located remotely from a vending machine and configured to receive the first transmitted signal, generate a third encoded signal responsive to the second encoded signal, and transmit a second transmitted signal, wherein the second transmitted signal contains information from third encoded signal, the information comprising additional instruction codes and associated data fields corresponding to additional status conditions when signals received at the first transceiver each include a same destination identifier and a same telephone number, and a burst transmission length identifier that identifies the number of individual instruction codes and associated data fields.

2. The system as defined in claim 1, wherein the plurality of sensors comprises at least one product sensor.

3. The system as defined in claim 1, wherein the plurality of sensors comprises at least one operational status sensor.

4. The system as defined in claim 1, wherein the transmitter is a radio-frequency transmitter.

5. The system as defined in claim 1, wherein the first transceiver is a radio-frequency transceiver.

6. The system as defined in claim 1, wherein the first transmitted signal further includes a transmitter identifier.

7. The system as defined in claim 1, wherein the second transmitted signal further includes a transceiver identification code associated with the first transceiver.

8. The system as defined in claim 1, wherein the first transceiver further includes a look-up table.

9. The system as defined in claim 1, wherein the plurality of sensors are implemented in compliance with the International Multi-Drop Bus Interface Standard as adopted by the National Automatic Merchandising Association.

10. The system as defined in claim 9, further comprising a second transceiver located remotely from the vending machine configured to receive the second transmitted signal, said second transceiver including means to encode and communicate a third transmitted signal, the third transmitted signal containing information from the third encoded signal.

11. The system as defined in claim 10, further comprising a central station located remote from the second transceiver and in communication with the second transceiver via the telephone number, said central station having an interface to the PSTN configured to receive the third transmitted signal, said central station further having an apparatus configured to evaluate the third transmitted signal.

12. The system as defined in claim 11, wherein the central station further includes means for notifying service personnel of a service condition in response to the second transmitted signal.

13. The system as defined in claim 11, wherein the central station further includes means for notifying supply personnel of a need for product supply in response to the second transmitted signal.

14. The system as defined in claim 10, wherein the second transceiver is configured to communicate with a central station located remote from the second transceiver via a cellular communication system.

15. The system as defined in claim 14, wherein said central station includes an interface to receive the third transmitted signal, said central station further configured to evaluate the encoded message and identify appropriate service personnel responsive to the predetermined status condition.

16. A method for encoding a signal comprising:
   encoding the signal to include a source identifier associated with a first transceiver;
   encoding the signal to include a destination identifier associated with a second transceiver;
   encoding the signal to include a telephone number;
   encoding the signal to include at least one instruction code corresponding to a service request associated with a point-of-service apparatus in response to a first status condition;
   encoding the signal to include a data field associated with the at least one instruction code;
   concatenating the signal with additional instruction codes corresponding to additional status conditions when radio-frequency signals received at the first transceiver include the destination identifier and the telephone number; and
   encoding the signal to include a burst transmission length identifier that identifies the number of concatenated instruction codes and data fields.

17. The method of claim 16, wherein the telephone number is assigned to a cellular transceiver used to couple the point-of-service apparatus with a central station configured to dispatch appropriate personnel responsive to the instruction codes.

18. The method as defined in claim 16, further comprising encoding the signal to include a field adaptively configured for data transmission error correction.

19. The method as defined in claim 16, further comprising a field configured to indicate to a destination device that a subsequent message is to follow.

20. A method for monitoring and performing an automated service request comprising the steps of:
   disposing sensors within a vending machine to sense a service condition;
   sensing the service condition;
   disposing sensors within a vending machine to sense a product quantity condition;
   sensing the product quantity condition;
   transmitting a first signal to a remotely-located transceiver, the first signal including an encoded message that specifies both the service condition and product quantity condition, the first signal including at least one instruction code corresponding to a service request associated with the vending machine in response to the service condition and a data field associated with the at least one instruction code;
   receiving the first signal at the remotely-located transceiver;
   concatenating the first signal with additional instruction codes and associated data fields corresponding to additional status conditions when radio-frequency signals received at the remotely-located transceiver include a same destination identifier and a same telephone number;
   encoding the first signal to include a burst transmission length identifier that identifies the number of concatenated instruction codes and data fields; and
   communicating at least the first signal from the remotely-located transceiver to a central station via a telecommunications network, at least a portion of the telecommunications network comprising a cellular communications system.

21. The method as defined in claim 20, further including:
   communicating a transceiver identification code to the central station.

22. The method as defined in claim 20, further including:
   evaluating the transceiver identification code at the central station to determine a geographic location of the transceiver.

23. The method as defined in claim 22, wherein evaluating the transceiver identification code at the central station includes decoding both the encoded message and the transceiver identification code to identify the service request.

24. The method as defined in claim 23, further including:
   initiating a service call in response to the decoding.

* * * * *